Feb. 10, 1953      E. C. HANDWERK      2,628,077
METHOD OF EFFECTING INDIRECT HEAT TRANSFER
Filed May 17, 1949      2 SHEETS—SHEET 1
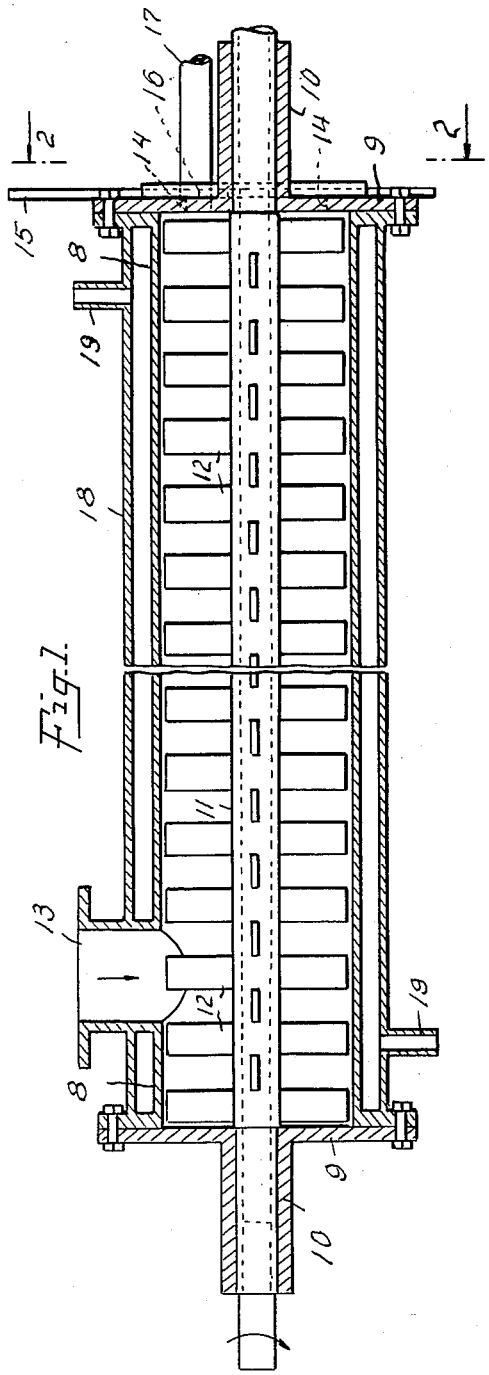
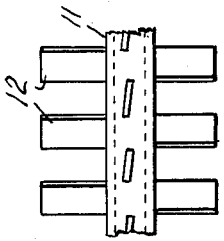
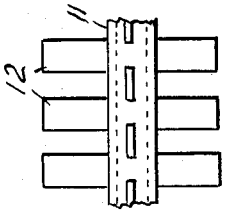
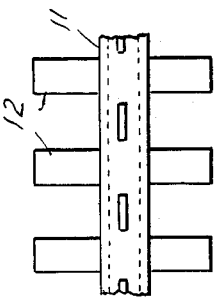
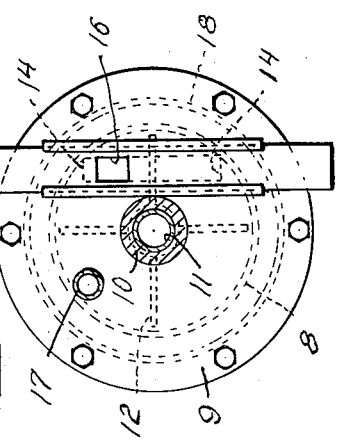
INVENTOR.
ERWIN C. HANDWERK
BY
ATTORNEYS Feb. 10, 1953  E. C. HANDWERK  2,628,077
METHOD OF EFFECTING INDIRECT HEAT TRANSFER
Filed May 17, 1949  2 SHEETS—SHEET 2

INVENTOR
ERWIN C. HANDWERK
BY
*Pennie, Edmonds, Morton and Barrows*
ATTORNEYS

Patented Feb. 10, 1953

2,628,077

UNITED STATES PATENT OFFICE 2,628,077

METHOD OF EFFECTING INDIRECT HEAT TRANSFER

Erwin C. Handwerk, Lehighton, Pa., assignor to The New Jersey Zinc Company, New York, N. Y., a corporation of New Jersey Application May 17, 1949, Serial No. 93,698

3 Claims. (Cl. 257—84)

This invention relates to heat transfer and, more particularly, to a novel method of effecting indirect heat transfer between discrete particles of a solid and a temperature-controlling medium.

In a wide variety of solid-treating processes, it is necessary to effect heat transfer between the solid and a temperature-controlling medium without permitting contact between the two. Such heat transfer may be in the nature of a heating operation wherein the temperature of the solid is to be raised for the purpose of promoting a reaction or of merely removing water therefrom. On the other hand, the operation may be such as to require the removal of heat from the solid, whether this heat be the sensible heat of the solid or the heat of reaction generated by contact between the solid and a gaseous atmosphere in contact therewith. As carried out pursuant to conventional practice, the indirect transfer of heat between a solid and a temperature-controlling medium has been notably inefficient.

I have now devised a method of effecting indirect heat transfer between discrete particles of a solid and a temperature-controlling medium characterized by a heat transfer rate which is many times that of the conventional procedures in use heretofore. This result is obtained by maintaining the particles of the solid in a fluidized state by mechanical agitation and by effecting indirect heat transfer between the fluidized mass and the temperature-controlling medium.

The method of effecting indirect heat transfer in accordance with the invention comprises introducing discrete particles of a solid into one end of a substantially horizontally disposed elongated vessel, maintaining the temperature-controlling medium in contact with the exterior surface of the vessel, maintaining within the vessel a mass of said particles sufficient in amount to produce a fluidized mass thereof when mechanically agitated in the presence of the atmosphere prevailing within the vessel, maintaining the particles of the solid in contact with the interior surface of the vessel in the form of a fluidized mass by mechanically agitating the particles of solid in the presence of said atmosphere, and discharging the particles of solid from the vessel adjacent the other end thereof. The particles of solid pass through the vessel by fluid flow of the fluidized mass. Heat transfer is thus effected through a heat-conducting partition between the temperature-controlling medium and the solid while the latter is maintained in a fluidized condition. But the heat transfer is never such as to raise the temperature of the particles to their fusion point which would interfere with maintaining them in a fluidized condition.

These and other novel features of the invention will be more fully understood by reference to the following description taken in conjunction with the drawings in which Fig. 1 is a sectional side elevation of apparatus suitable for carrying out the method of the invention;

Fig. 2 is an end view of said apparatus taken along line 2—2 in Fig. 1;

Figs. 3, 4 and 5 show variations in the paddle structure within the apparatus whereby the particles of the solid may be maintained in a fluidized condition.

Figure 6:
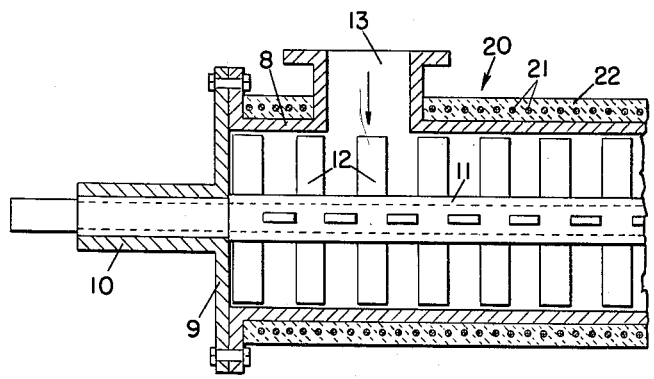
Fig. 6 is a partial sectional side elevation of the apparatus shown in Fig. 1 provided with a space heater in lieu of a heating jacket.

Apparatus suitable for practicing the method of my invention comprises, as shown in Fig. 1, a substantially horizontally disposed elongated vessel 8 which may be substantially cylindrical in shape or may be trough-like in cross section. The essential requirement with regard to the shape of the vessel is that it be adapted to permit sufficient mechanical agitation of the particles of solid therewithin as to maintain a mass of the particles in a fluidized condition. The ends of the vessel 8 are provided with closure plates 9 which may advantageously be provided with bushings 10 adapted to serve as bearings for a rotatable shaft 11 axially mounted within the vessel 8. Paddle blades 12 are mounted on the shaft within the vessel in such manner as to permit sufficient mechanical agitation of the particles of solid within the vessel to maintain the particles in a fluidized condition. The vessel is provided adjacent the upper portion thereof with an inlet 13 for charging the particles of solid near one end of the vessel, and the vessel is provided at the opposite end thereof with an outlet 14 adapted to discharge the treated solids from the vessel. The outlet 14 is advantageously formed as a vertically disposed slot in the end closure plate 9, as shown more clearly in Fig. 2. An adjustable discharge opening for the outlet is provided by a sliding cover plate 15 having an opening 16 therein. By raising or lowering the cover plate 15, the discharge opening 16 may be raised or lowered as an adjustable weir to control the level of solids within the vessel. The vessel may be further provided with a gas inlet line 17 adjacent the solids-discharge end of the vessel if it is desired to effect contact between the solid and a gas during the heat exchange procedure in accordance with my invention. If such a gas is introduced into the vessel, it may be withdrawn advantageously through the solids-charging inlet 13.

The method of the invention is practiced in the apparatus shown in Fig. 1 by rotating the shaft 11 at a relatively high speed. The particles of the solid are introduced through the inlet 13 into the interior of the vessel 8. Rotation of the shaft 11 at high speed causes the paddle blades 12 to agitate the particles of solid within the vessel to such an extent that the mass of particles within the vessel is expanded in the atmosphere prevailing within the vessel. In this expanded condition, the mass of particles behaves like a fluid. The fluidized mass flows from the solids-charging end of the vessel to the solids-discharging end where it is discharged through the adjustable opening 16 associated with the outlet 14. In the course of this flow through the vessel, the fluidized mass makes virtually liquid contact with the entire inner surface of the vessel. The constant fluid movement of the fluidized mass along and in contact with the confining walls of the vessel 8 leads to spectacular rates of heat transfer between the fluidized mass of solid particles and the temperature-controlling medium on opposite sides of the walls of the vessel. The rate of flow of fluidized solid through the vessel 8, and hence its period of heat-exchange relationship with the temperature-controlling medium, substantially follows conventional hydraulic principles. Thus, an increase in the hydrostatic head of material provided at the solids-charging end of the vessel by an increase in its charging rate results in a substantially proportionate increase in the rate of flow of fluidized solid through the vessel. The depth of the fluid bed through which the solids pass is determined by the vertical position of the discharge opening 16. Accordingly, the retention period of the fluidized solid in contact with the heat-conducting walls of the vessel 8 is controlled by a combination of control of the solids feeding rate and the height of the discharge opening 16.

The method of my invention, as pointed out hereinbefore, is characterized by the maintenance of the solids within the treating vessel in the form of a fluidized mass. If the solids were permitted to discharge from substantially the level of the lower portion of the vessel 8, the only solids retained in the vessel would be those forming a layer thereof on the inner surface of the vessel, the thickness of the layer being substantially equal to the clearance between the extremities of the paddles 12 and the inner surface of the treating vessel. In accordance with the method of my invention, the solids are discharged from the treating vessel in such manner as to maintain therein a mass of the solid particles sufficient in amount to produce a fluidized mass thereof when mechanically agitated in the presence of the atmosphere prevailing within the vessel. Thus, by providing a solids-discharge opening at a level substantially above the bottom of the treating vessel, a mass of the solid particles is maintained within the vessel which substantially exceeds the amount of solids which would simply form a layer of the solid particles on the inner surface of the vessel. This larger mass of solids is therefore mechanically agitated by the paddles 12, and, in the presence of the atmosphere prevailing within the vessel, the agitated solid particles form a fluidized mass. The resulting fluidized mass flows along the interior of the treating vessel at a rate determined by the solids-charging rate and by the depth of the fluid bed maintained within the vessel.

The size of the particles of solids which may be treated in accordance with the method of my invention may range from that of a powder up to particles having an average diameter of ½ to ¾ inch, and even up to one inch diameter. The minimum particle size is limited only by the severity of "dusting," i. e. the loss of such fine particles in the treating atmosphere discharged from the treating apparatus. When the finely divided solid is charged in the wet or moist condition, the damp charge serves as a filter to remove dry fines from the exhaust gas discharged through the solids-charging inlet 13. The maximum particle size is generally limited by the rate at which heat can be transferred to or from the center of the particles within the treating period in accordance with my method. In general, the maximum practical particle size is about one inch in diameter. Thus, the method is capable of handling such solids as zinc oxide (ranging from 0.2 to 0.5 micron average particle size), 100–300 mesh zinc dust, fine coal, zinc sulfide ore concentrate of which 50% passes through a 200 mesh screen (Tyler Standard), slack bituminous coal up to about ½ inch diameter particles, ⅛ to ¼ inch particles of crushed limestone, crushed iron-titanium ore such as ilmenite having a maximum particle size of about ½ inch diameter, and manganese ore having a maximum particle size of about one inch diameter.

The temperature-controlling jacket 18 may be used either for supplying heat to or removing heat from the mechanically fluidized mass within the vessel 8. For example, a heating medium such as superheated steam or the combustion gases from a heating fuel may be circulated through the jacket 18, the medium being supplied to and withdrawn from the jacket through suitable inlet and outlet lines 19. Heating may also be provided by a space heater 20 substituted for the jacket 18. Such a space heater may comprise electric resistance elements 21 embedded in a suitable matrix 22 and positioned adjacent the exterior surface of the vessel 8. On the other hand, a cooling medium such as air or water may be circulated through the jacket 18 when it is desired to remove heat from the mechanically fluidized mass within the vessel.

The paddle structure is not critical but should be such as to provide the necessary degree of agitation of the solid within the vessel as to maintain the solid in a fluidized condition. Flat paddle blades are generally suitable for this purpose. The blades are advantageously mounted in pairs positioned diametrically opposite one another about the shaft 11. Although, as shown in Fig. 1, the paddles 12 effectively fill up the length of the shaft 11 within the contacting vessel, gaps may be left between the positions of adjacent pairs of paddles as shown in Fig. 3, or the positions of adjacent pairs of paddles may overlap as shown in Fig. 4. It has been found that, for most purposes, paddle blades having their flat faces disposed parallel to the axis of the shaft produce suitable results, although the blades may be turned or pitched somewhat, as shown in Fig. 5, in order either to accelerate the flow of solids through the vessel or to retard their flow therethrough. As further shown in Figs. 3 through 5, the shaft 11 may be of hollow construction so that the shaft can be cooled or heated by the passage of a suitable temperature-controlling medium therethrough.

The speed of rotation of the shaft required to produce the desired fluidization of the particles of solid within the contacting vessel depends upon the cross-sectional size of the vessel, the number of paddles positioned circumferentially about the shaft 11, and the size and density of the solid particles to be fluidized. In general, the peripheral speed of the ends of the paddles 12, which terminate out of contact with the inner surface of the vessel 8, should be within the range of about 150 to 450 feet per minute. Accordingly, with an increase in the cross-sectional size of the treating vessel 8, the speed of rotation of the shaft 11 is decreased in order not to impart such peripheral speed to the solid particles adjacent the inner surface of the vessel as to cause excessive wear of this surface. As the size of the vessel is increased and the speed of rotation of the paddle-bearing shaft is decreased, it is generally desirable to increase the number of paddles positioned circumferentially about the shaft in order to provide the desired mechanical agitation of the particles of solid within the vessel. For example, it has been found that in a treating vessel having an internal diameter of 12 inches, the shaft should be rotated at a speed ranging from 50 to 150 R. P. M. Suitable fluidization of the solid is effected at these speeds by arranging the paddles about the shaft in diametrically positioned pairs with successive pairs of paddles positioned 90° out of phase. In a larger vessel having an internal diameter of 3 feet, the shaft should be rotated at a speed within the range of 20 to 60 R. P. M. with a set of 4 paddles disposed at each position on the shaft and with each set of paddles 45° out of phase.

A wide variety of gases may be brought into contact with the fluidized solid while practicing the heat-transfer method of my invention. Such gases may be relatively inert with respect to the solids or they may be reactive therewith. For example, an inert gas may comprise the moisture in the form of steam which is removed from particles of zinc dust or powdered coal while the solid is heated in accordance with the method of the invention by supplying steam under suitable pressure to the temperature-controlling jacket 13. A reactive gas, for example, may comprise a mixture of air and steam provided for reaction with powdered anthracite at an elevated temperature for the production of producer gas. The gas is advantageously passed through the fluidized mass of solid particles in countercurrent flow, the gas being introduced into the vessel through the inlet line 17 and being withdrawn through the solids-charging inlet 13.

The following examples will serve to illustrate the practice of my invention as well as the remarkably high heat-transfer rate obtained thereby. In each of these examples, the method was practiced in apparatus substantially the same as that shown in Fig. 1 of the drawings, the vessel being a cylindrical shell having an internal diameter of 12 inches and a length of 8 feet. The paddle-bearing shaft was rotated at about 120 R. P. M.

*Example I*

Slack bituminous coal, of such size as to pass through a ½ inch screen and containing about 12% by weight of water, was charged to the treating vessel at the rate of 2,000 pounds of wet coal per hour. The vessel was maintained at drying temperature by passing steam at a pressure of 100 pounds per square inch through the heating jacket. At this charging rate, the heat transfer coefficient of about 44 B. t. u. per square foot per hour per degree Fahrenheit temperature difference between the average steam jacket and fluidized coal temperatures was capable of reducing the moisture content of the coal to 5%. In this latter condition the coal is considered "dry" and is suitable for such metallurgical purposes as ore smelting and the like. The heat transfer rate obtained by drying coal in accordance with my method is many times greater than that obtainable with a conventional indirect steam heated rotary drier. This difference is clearly apparent when it is realized that the slack coal can be dried in accordance with my method with only about one-ninth the heating surface area required for drying in such a conventional rotary steam drier.

*Example II*

The method of my invention is particularly effective for rapid cooling of a solid such as the hot partially reduced manganese ore discharged from a reducing furnace wherein the manganese oxide content of the ore is largely reduced to manganous oxide in order to prepare a charge suitable for the production of low carbon ferromanganese. The partially reduced manganese ore must be cooled quickly as it leaves the reducing furnace in order to prevent reoxidation of the MnO content of the treated ore. It has been found the 12 inch diameter treating shell described hereinbefore can easily cool about 18 tons per day of such partially reduced manganese ore from a temperature of about 1500° F. to about 150° F. using a cooling period (retention time) of only 5 to 6 minutes without effecting any appreciable reoxidation of the MnO. The ore particles ranged in size up to a maximum of about one inch in diameter and were maintained in a fluidized condition in the presence of the atmosphere prevailing within the cooling vessel. At this charging rate, which appears to be well below the maximum capacity of the specific apparatus, the heat transfer coefficient is about 25 B. t. u. per square foot per hour per degree Fahrenheit difference between the average fluidized ore temperature within the shell and the average cooling water temperature in the jacket surrounding the shell.

It will be appreciated that the method of my invention makes possible a remarkably high heat transfer rate between a solid and a temperature-controlling medium. It is also characteristic of my method that an exceptionally uniform degree of heat transfer is maintained throughout. Consequently, the method is pre-eminently applicable to any solids-treating process wherein it is desired to establish as rapidly as possible, and to maintain as uniformly as possible, a specific temperature condition throughout a mass of solid particles. Inasmuch as the solid particles are maintained in the form of a mechanically fluidized mass in accordance with the method of the invention, the solid is in a form particularly amenable to efficient simultaneous contact with an inert or reactive treating gas.

I claim:

1. The method of effecting indirect heat transfer between discrete particles of a solid and a temperature-controlling medium which comprises introducing the particles of the solid into one end of a substantially horizontally-disposed elongated vessel, maintaining the temperature-controlling medium in heat-exchange relation with the interior surface of said vessel, mechanically agitating said particles in the presence of the atmosphere prevailing within the vessel and with impelling forces of sufficiently high velocity to maintain the particles in suspension and thus form a fluidized mass of said particles, maintaining the temperature of the particles during such agitation below their fusion point so that they maintain their discrete form, discharging the particles of solid from the vessel adjacent the other end thereof at a predetermined height above the bottom of the vessel to maintain within the vessel a mass of said particles sufficient in amount to produce a fluidized mass thereof during said agitation, and controlling the retention period of said fluidized mass within the vessel essentially by control of the rate of introduction of the solid particles into the vessel.

2. The method of effecting indirect heat transfer between discrete particles of a solid and a temperature-controlling medium which comprises introducing the particles of the solid into one end of a substantially horizontally-disposed elongated vessel, maintaining a fluid temperature-controlling medium in heat-exchange relation with the interior surface of said vessel, mechanically agitating said particles in the presence of the atmosphere prevailing within the vessel and with impelling forces of sufficiently high velocity to maintain the particles in suspension and thus form a fluidized mass of said particles, maintaining the temperature of the particles during such agitation below their fusion point so that they maintain their discrete form, discharging the particles of solid from the vessel adjacent the other end thereof at a predetermined height above the bottom of the vessel to maintain within the vessel a mass of said particles sufficient in amount to produce a fluidized mass thereof during said agitation, and controlling the retention period of said fluidized mass within the vessel essentially by control of the rate of introduction of the solid particles into the vessel.

3. The method of effecting indirect heat transfer between discrete particles of a solid and a temperature-controlling medium which comprises introducing the particles of the solid into one end of a substantially horizontally-disposed elongated vessel, maintaining the temperature-controlling medium in heat-exchange relation with the interior surface of said vessel, maintaining a moving gaseous atmosphere within said vessel, mechanically agitating said particles in the presence of the atmosphere prevailing within the vessel and with impelling forces of sufficiently high velocity to maintain the particles in suspension and thus form a fluidized mass of said particles, maintaining the temperature of the particles during such agitation below their fusion point so that they maintain their discrete form, discharging the particles of solid from the vessel adjacent the other end thereof at a predetermined height above the bottom of the vessel to maintain within the vessel a mass of said particles sufficient in amount to produce a fluidized mass thereof during said agitation, and controlling the retention period of said fluidized mass within the vessel essentially by control of the rate of introduction of the solid particles into the vessel, the gaseous atmosphere being passed through the fluidized mass of discrete solid particles in counterflow thereto.

ERWIN C. HANDWERK.

REFERENCES CITED

The following references are of record in the file of this patent:

UNITED STATES PATENTS

| Number | Name | Date |
| --- | --- | --- |
| 1,735,396 | Hiller | Nov. 12, 1929 |
| 1,798,857 | Tyler | Mar. 31, 1931 |
| 1,858,796 | Wilcoxon | May 17, 1932 |
| 2,220,193 | Ahlmann | Nov. 5, 1940 |

FOREIGN PATENTS

| Number | Country | Date |
| --- | --- | --- |
| 292,642 | Great Britain | June 22, 1928 |